(12) United States Patent
Boltshauser

(10) Patent No.: US 7,971,771 B2
(45) Date of Patent: Jul. 5, 2011

(54) METHOD AND DEVICE FOR PRODUCING TUBULAR JACKETS

(75) Inventor: Werner Boltshauser, Bütschwil (CH)

(73) Assignee: Crebocan AG, Butschwel (CH)

( * ) Notice: Subject to any disclaimer, the term of this patent is extended or adjusted under 35 U.S.C. 154(b) by 680 days.

(21) Appl. No.: 11/795,260

(22) PCT Filed: Jan. 14, 2006

(86) PCT No.: PCT/CH2006/000031
§ 371 (c)(1),
(2), (4) Date: Mar. 31, 2008

(87) PCT Pub. No.: WO2006/074570
PCT Pub. Date: Jul. 20, 2006

(65) Prior Publication Data
US 2009/0008429 A1    Jan. 8, 2009

(30) Foreign Application Priority Data

Jan. 14, 2005   (WO) ............... PCT/CH2005/000016

(51) Int. Cl.
*B23K 31/02* (2006.01)
(52) U.S. Cl. ............................................... 228/160
(58) Field of Classification Search ................. 228/160
See application file for complete search history.

(56) References Cited

U.S. PATENT DOCUMENTS 3,337,944 A * 8/1967 Morris ........................ 29/413
7,584,639 B2 * 9/2009 Boltshauser ................. 72/379.4

FOREIGN PATENT DOCUMENTS

| DE | 14 52 556 | 4/1969 |
| FR | 1 599 934 | 7/1970 |
| GB | 878 713 | 10/1961 |
| WO | WO 2005/000498 | 1/2005 |

OTHER PUBLICATIONS

Machine Translation of FR-1599934 which originally published Jul. 20, 1970.*

(Continued)

*Primary Examiner* — Jessica L Ward
*Assistant Examiner* — Nicholas P D'Aniello
(74) *Attorney, Agent, or Firm* — Harness, Dickey & Pierce, P.L.C.

(57) ABSTRACT

In at least one embodiment, for producing segments of tubular jackets, a strip-shaped sheet material is continuously reshaped transverse to the strip axis into a closed form and following the welding of a longitudinal seam, jacket sections are cut off the jacket strip. In at least one embodiment, a support edge is provided on the inside of the continuously formed jacket strip for the cutting operation, essentially in the form of a closed circle and extending in a normal plane to the longitudinal axis of the jacket strip, which fits directly against the inside of the jacket strip and cooperates with at least one cutting tool. The cutting tool is pivoted into the cutting position during the cutting operation along the support edge, so that a cutting region rotates once around the longitudinal axis. A section of the jacket strip is cut off, wherein during the cutting operation, the support edge and the at least one cutting tool are advanced along with the jacket strip. Following the cutting operation, the at least one cutting tool is moved to a non-contacting position relative to the support edge and together with the support edge is moved counter to the movement of the jacket strip and back to the starting position occupied prior to the cutting operation.

7 Claims, 4 Drawing Sheets

OTHER PUBLICATIONS

Official translation of FR-1599934 which originally publshed Jul. 20, 1970.*
International Preliminary Report on Patentability (IPER) and Written Opinion for PCT Application No. PCT/CH2006/000031 dated Aug. 3, 2007.

* cited by examiner

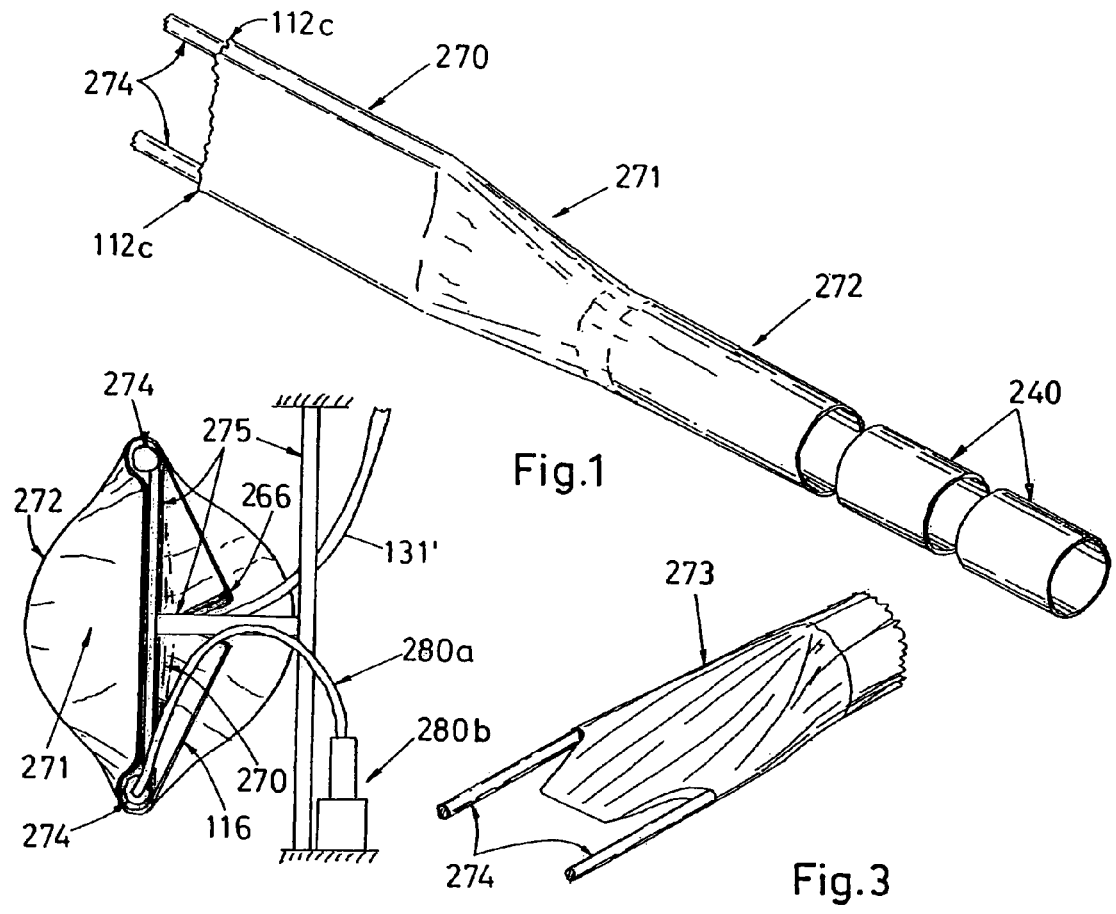
Fig.1
Fig.2
Fig.3
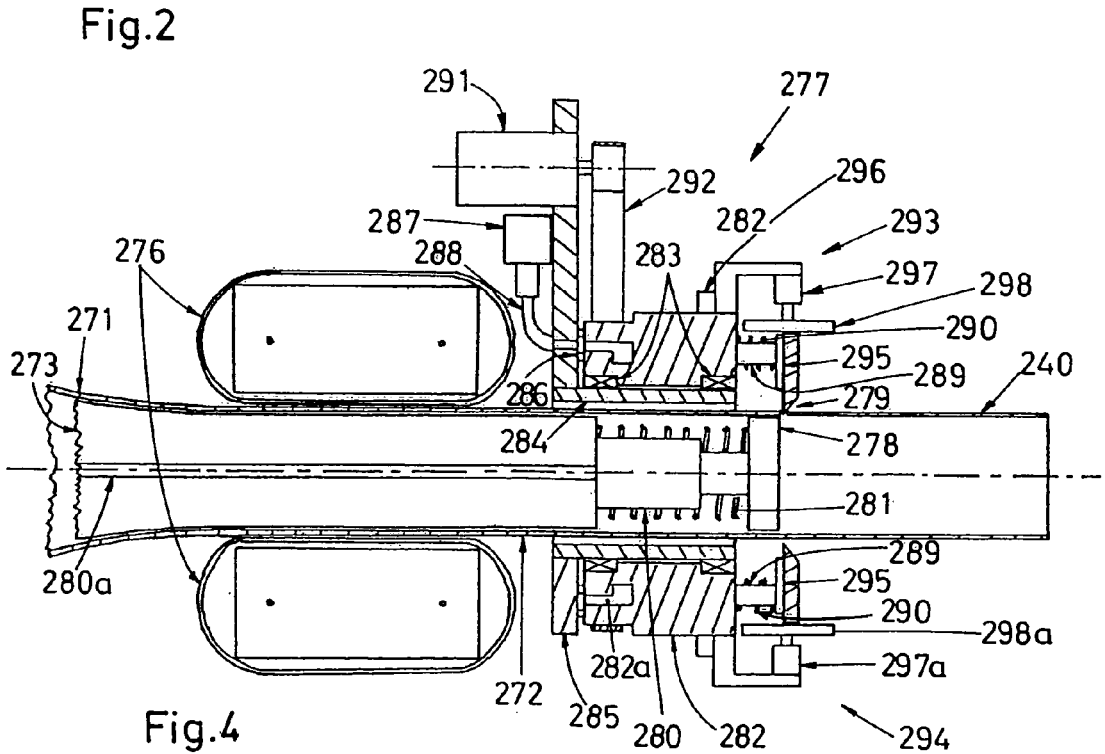
Fig.4

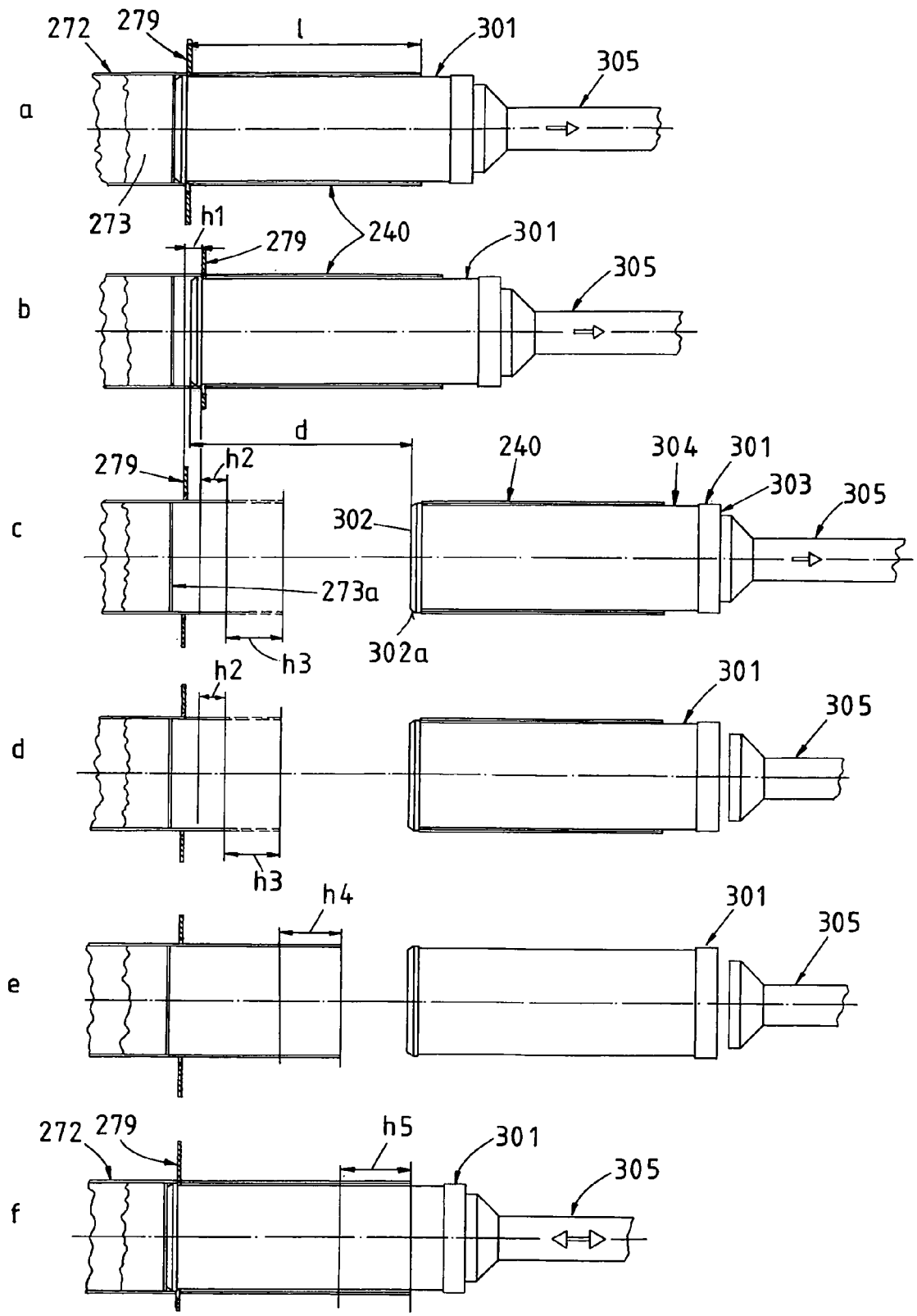

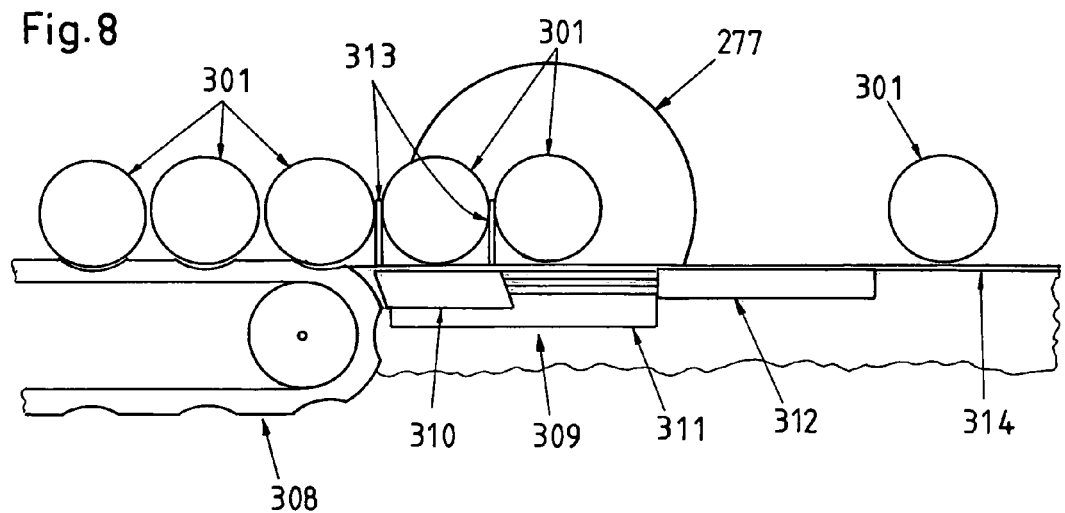
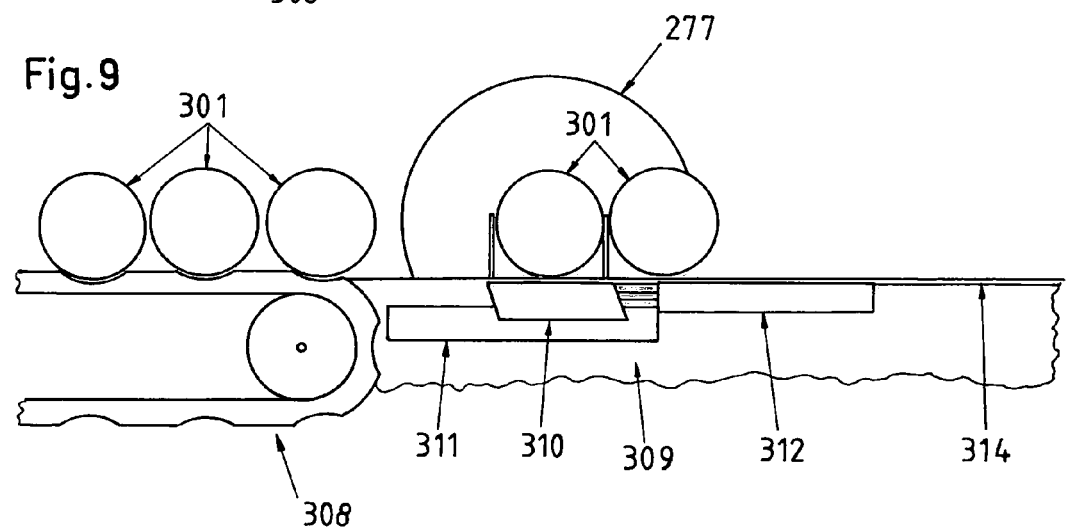

METHOD AND DEVICE FOR PRODUCING TUBULAR JACKETS

PRIORITY STATEMENT

This application is the national phase under 35 U.S.C. §371 of PCT International Application No. PCT/CH2006/000031 which has an International filing date of Jan. 14, 2006, which designated the United States of America and which claims priority on PCT International Application number PCT/CH2005/000016 filed Jan. 14, 2005, the entire contents of which are hereby incorporated herein by reference.

FIELD

At least one embodiment of the invention relates to a method and/or to a device.

BACKGROUND

When producing metal parts having a circumferential wall, that is closed in peripheral direction, a flat ribbon material may continuously be transformed into a closed shape. To this end, the two lateral edges are combined around a longitudinal axis, and are interconnected by a welding seam. From the emerging tubular piece, the desired sections of circumferential wall, tubular jackets, are dissevered. The tubular jackets may be used as parts of a pipe or may be further processed into the respectively desired parts.

Widely used are cans made from sheet steel for which the jacket has a longitudinal welding seam. The bottom and/or the upper closure are attached to the can jacket. WO2005/000498 A1 discloses embodiments of can bodies with a can jacket made of sheet material. A bottom or an upper closing part is attached by way of laser welding to the can jacket.

Under the term of "can body", one should understand every receptacle, in particular aerosol cans or beverage cans, but also collapsible tubes and intermediate products in the shape of a receptacle.

Known embodiments have a longitudinal can seam for closing the can jacket formed in the manner of a butt seam. For this, the edge regions on the side, which are to be joined, are guided along respectively one guide face, wherein these guide faces are oriented toward each other and extend over the complete length of the seam. So that the end faces of thin edge regions meet precisely, both edge regions are held against the partial guide faces. An exact meeting of the end faces of the two edge regions can be ensured by moving at least one edge region along the partial guide face toward the other edge region until they make contact. Once these regions are pushed together, the welding operation can be carried out.

So that no guide surfaces of the processing device need be arranged inside the can jacket, partial surfaces on the inside of the can jacket are used as guide faces. Welding of the longitudinal seam is carried out on a flat-pressed can jacket. In the welding-seam region between the two guide faces, a recess leading away from the edge regions to be joined and/or a region projecting outward from the jacket is formed, so that a connection to the guide faces is avoided during the welding operation. The adjoining, level partial surfaces are connected via curved regions.

So that no cracks or undesirable bulges are created in radial direction on the can jacket during the expanding of the flat-pressed can jacket, a form having a small radius of curvature but without folds is used in the flat-pressed state. The can jacket is essentially flat-pressed between the regions of curvature, so that a purposeful pressing together in at least one curvature region ensures the pressing together of the end faces during the welding operation.

The seam can be formed with the aid of different welding techniques, wherein a laser-welded seam is preferred. The flat material thus should comprise at least one metal seam that can be welded with a laser. In most cases, sheet steel materials are used which have good deformation characteristics and can be purchased with the desired thickness.

If necessary, the can jacket sections can be cut with a saw from the strip material, for which a saw blade or a saw belt moves along with the produced can tube during the sawing operation. The at least one cutting device is retracted following the cutting of a can tube section. Owing to the short sections and/or the small can heights, known cutting devices have disadvantages because they cannot cut and move back quickly. A further disadvantage of the known cutting devices is that particularly during the cutting of thin-walled tubes, there is danger of deformation and thus jamming. In addition, known cutting methods create shavings which would require further cleaning steps and/or create problems during the following can production stages.

According to references WO2005/000498 A1 and DE 1 452 556, a quick and clean cutting operation is ensured if the flat-pressed can jacket-strip material with pre-notched curved regions is moved along on a support, which can cooperate with a cutting edge. As soon as the desired length of the tube section is advanced, the cutting edge is moved in a cutting motion through the adjoining wall regions of the tube. The disadvantage of this cutting solution is the need for prenotching before welding the longitudinal seam and precise cutting aligned with the prenotched cuts after welding.

SUMMARY

At least one embodiment of the present invention finds a solution with which one is able to cut quickly and without any deformation without the necessity of prenotching.

In the search for an alternative process for cutting can jackets from a continuous wall material created by way of a longitudinal welding seam, a solution was discovered which is new and inventive, regardless of the can production. With this solution, a support edge is provided on the inside of the continuously formed can jacket-strip and/or the wall material. The support edge is essential closed in circular direction, extends in a normal plane relative to the longitudinal axis of the wall material, and fits directly against the inside of the wall material. At least one cutting tool is assigned to this support edge, preferably a cutting ring, wherein the tools are turned along the cutting edge during the cutting operation. Thus, at least one cutting region is rotated once around the wall material and a section of the wall material is cut off in the process. During the cutting operation, the support edge and the cutting ring and/or the cutting element move along with the wall material. After the cutting operation, the cutting ring and/or the cutting elements are moved to a concentric position relative to the support edge and, together with the support edge, moved in the direction of the longitudinal axis and, counter to the wall material movement, back to the starting position occupied prior to the cutting operation, such that another cutting operation can be realized. The cutting ring can be rotated continuously for this cutting and retracting operation. The cutting ring must be moved with correct timing from the concentric to the eccentric position.

With this new cutting approach, one may do without prenotched cuts previously formed in the strip material. Even with extremely thin sheet material, it enables a quick cut free from deformation.

If the wall material is flat-pressed during the welding of the longitudinal seam, an expansion element must be arranged between the welding device and the support edge on the inside of the wall material, which reshapes the flat-pressed wall material to the circular cross-sectional shape of the support edge. The expansion element can be fastened to two holding rods, which are guided along the curved regions on the side of the flat-pressed wall material. These two holding rods extend from the expansion element to a region in which the wall material is not yet closed, thus making it possible to connect the rods with holding parts on the outside of the wall material. The support edge is positioned in such a way on the expansion element that it can be moved in longitudinal direction, wherein the support edge movement is coupled to the longitudinal movement of the cutting ring.

The support edge may also be held and moved from the side averted from the expansion element. To this end, it has to be introduced into the jacket section to be cut from the open side in opposite direction to the direction of advance of the jacket strip. During cutting, the support edge should engage the inside of the wall material in a position which is coordinated with the position of the cutting tool. In order that the cutting edge needs not to engage the wall material during introduction, it can be made expansible in radial direction, for example comprising radial displaceable spreading parts which form a portion of the support edge. The circumference is reduced for introduction, while it is increased for cutting. Having cut a jacket section, the circumference may be reduced anew, and the jacket section may be released from the support edge in an either laterally or vertically offset fashion to the forming jacket strip. The support edge will then be introduced into the tubular jacket strip, which in the meantime has already further advanced, for cutting the next jacket section.

The support edge may be moved by a piston part of the device for cutting the tubular sections. The piston part has to carry out the movements of the support edge with such a speed that the length of tube formed during cutting of a section is not larger than the length of the sections to be cut. Optionally, at least two support edges are provided so that the second support edge is able to be introduced, while the first support edge releases a cut jacket section, which results in a shorter cycle of operation. If the jacket sections are only delivered, the support edges form part of the piston part. Exchanging a piston part or a support edge, oriented to the forming tube, may either be achieved by displacing the piston parts transversely to the tube axis or by rotating the piston parts transversely to the tube axis about an axis of rotation. The exchange of two piston parts may be achieved by two movements in opposite directions. With a rotary approach, rotation may also be effected always in the same direction of rotation.

If the jacket sections, during subsequent processing, are held on a mandrel, it is suitable to put them, already during cutting, onto a cylindrical carrier by which they are supplied to further treatment. For the cutting step, these carriers have to comprise a support edge. In addition, they have to enable a releasable connection to the piston part. Conveying and treating the jacket sections is distinctively simplified by the carriers. The carriers comprise the support edge on a first front side, and a connecting device for a releasable connection with the piston part, and in-between a cylindrical support surface for carrying a jacket section. If a magnetic or spontaneously not magnetic but magnetizable material is arranged on the second front side 303 of the carrier 301, holding on the piston part and on a conveyor device can be achieved by an electromagnet.

The solution described is particularly advantageous for the production of can bodies, because the front sides of the jacket section are not affected by cutting, and because cutting can be effected very quickly. For cans particularly thin strip material is applied, which will be protected against an undesirable deformation by the support edge used. One may do without additional machining the front sides. Connecting the front sides to closing elements, such as can bottoms, valve seats or valve parts, is possible without any problem and will result with small expenses in esthetically attractive can bodies. Since a production throughput of 300 to 600 cans per minute is common in can production, quick cutting the can jackets, as ensured by the process described, is of paramount importance.

If the sheet material is provided with a decorative film and/or an inside film, the film can be cut together with the stabilizing part of the can jacket during the cutting operation of the open or closed jacket sections. As a result, no separate cutting of thin film pieces is required.

BRIEF DESCRIPTION OF THE DRAWINGS

The drawings explain the solution according to the invention with the aid of two example embodiments, which show in:

FIG. 1 a perspective representation of the can jacket strip during the process of expanding and cutting off individual can jackets, FIG. 2 a frontal view of the can jacket strip during the closing, welding, and expanding steps, FIG. 3 a perspective view of an expanding element for expanding the can jacket strip, FIGS. 4 and 5 longitudinal sections through a cutting device for cutting off the individual can jacket sections, FIG. 6 a diagrammatic representation of the supply of cylindrical carriers, FIG. 7 a diagrammatic representation of the cutting operation using a cylindrical carrier, and FIGS. 8 and 9 a diagrammatic representation each of the supply of cylindrical carriers.

DETAILED DESCRIPTION OF THE EXAMPLE EMBODIMENTS

Figure 5:
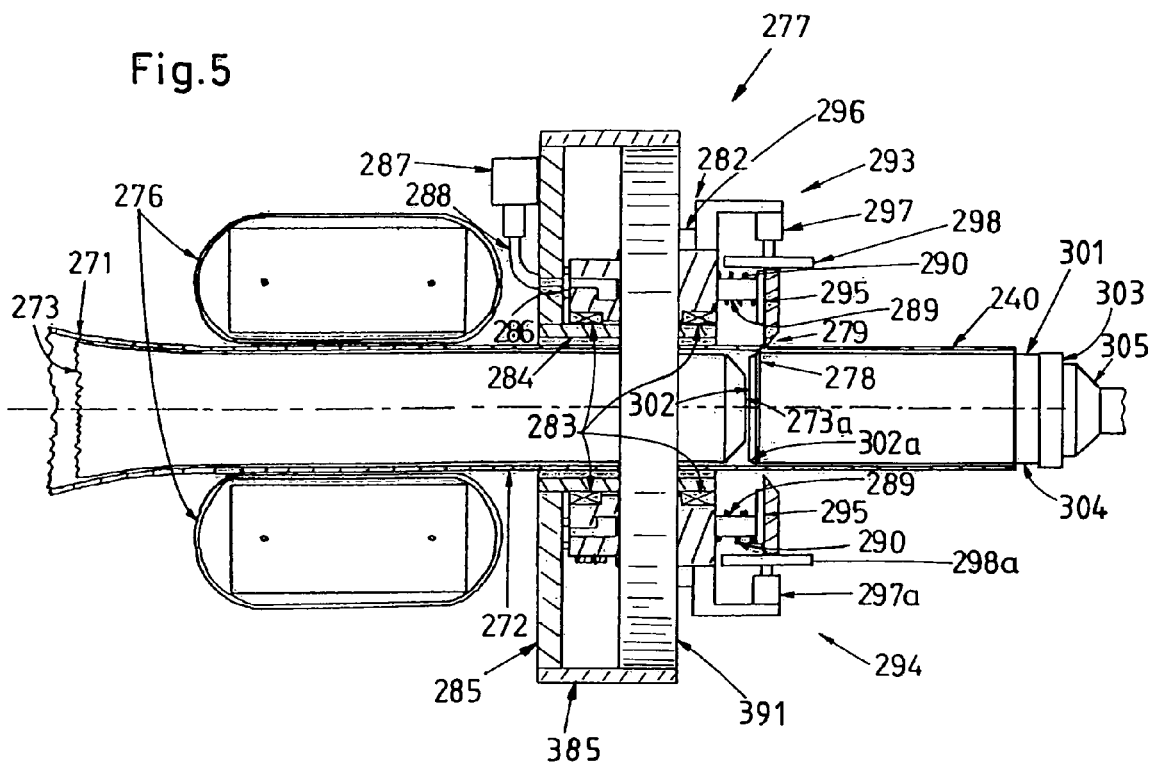

FIGS. 1 to 4 describe the solution for cutting off individual can jackets 240, which solution is new and inventive regardless of the can production.

FIG. 1 schematically shows how in an expansion region 271 a flat-pressed can jacket strip 270 is reshaped into a can jacket strip 272 with circular cross section with the aid of an expansion element 273 on the inside of the can jacket strip. Individual can jackets 240 are then cut off this circular can-jacket strip 272.

The expansion element 273 is held by holding rods 274 which are guided in the two curving regions 112c of the flat-pressed can jacket strip 270 and extend from the expansion element 273 to a holder 275, as shown in FIG. 2, meaning in a region in which the strip-shaped flat material 116 is not yet closed. A sealing bulge 266 is furthermore arranged on the flat material 116. The flat material is re-shaped by way of non-depicted rolls into the flat-pressed, closed form and welded with a laser beam provided by a laser feed 130'. Subsequently, the sealing bulge 266 is applied to the inside of the longitudinal seam 124, if necessary by way of a melting step. The can jacket strip is then moved to the expanding region 271 where it is reshaped to have a circular cross section.

FIG. 4 shows a device for cutting off individual can jackets 240. Conveying elements 276 fit without friction against the can jacket strip, preferably the circular can jacket strip 272, and pull the can jacket strip through the expansion region 271. The cutting device 277 comprises a support edge 278, which is closed to form substantially a circle that extends in a normal plane to the longitudinal axis of the can jacket strip, fits directly against the inside of the can jacket strip, and cooperates with at least one cutting tool 279, preferably a cutting ring. The cutting ring 279 is rotated eccentrically to the support edge 278 during the cutting operation, so that a cutting region rotates once around the longitudinal axis, thereby cutting off a section of the can jacket strip. During the cutting operation, the support edge 278 and the cutting ring 279 are advanced along with the can jacket strip. Following the cutting operation, the cutting ring 279 is moved to a concentric position relative to the support edge 278 and is moved along with the support edge 278 counter to the movement of the can jacket strip, back to the starting position occupied prior to the cutting operation.

The support edge 278 is positioned on the expansion element 273. To realize a controlled forward and backward movement, a piston-cylinder unit 280 is arranged, for example, between the expansion element 273 and the support edge 278 and possibly also a return spring 281. The piston-cylinder unit 280 is operated by way of a compressed fluid, for which a drive device 280b (FIG. 2) is connected via a feed line 280a to the piston-cylinder unit 280. It is understood that a different adjustment device can be used which is known from prior art, in particular one provided with an electric drive.

The cutting ring 279 is positioned on a rotating part 282, such that it can move in axial direction. The rotating part 282, in turn, is arranged rotating in bearings 284 on a support pipe 284, which projects in axial direction from a holding plate 285. A rotational feed-in 286 for a compressed fluid, for example, is provided between the holding plate 285 and the rotational part 282. The compressed fluid is supplied by way of a drive device 287 and via a feed line 288, the rotational feed 286, and a ring-shaped channel 282a to the piston-cylinder unit 289, which is attached to the rotating part 282 and moves the cutting ring 279 in the direction of the longitudinal axis. For the controlled forward and backward movement of the cutting ring 279, the piston-cylinder unit 289 is assigned respectively one return spring 290. It is understood that a different adjustment device known from prior art can also be used, in particular an electrically driven one.

For the cutting operation, the cutting ring 279 must be rotating and positioned eccentrically relative to the rotating part 282. A rotating drive 291 maintains the rotation of the rotating part 282 via a drive transmission 292, preferably a belt running on wheels. The change of the cutting ring 279 from the centered to the eccentric position is achieved, for example, with two adjustment devices 293, 294. The first adjustment device 293 pushes the cutting ring 279 into the eccentric position and/or the cutting position and the second adjustment device 294 pushes the cutting ring 279 into the centered position where the cutting ring 279 is not in contact with the can jacket strip. So that the cutting ring 279 can be moved into these two positions, the cutting ring 279 is attached via straight guides 295, which permit a movement transverse to the longitudinal axis, to the piston-cylinder units 289.

During the forward movement and/or the cutting ring 279 movement away from the rotating part 282, the cutting ring 279 must be in the eccentric position. During the return movement and with no movement in longitudinal direction, the cutting ring 279 must essentially be positioned centrally. During the advancing movement, the drive device 287 supplies compressed fluid with increasing pressure to the piston-cylinder units 289. A first control valve 296 is connected to the ring-shaped channel 282a and is designed such that with increasing pressure a first adjustment cylinder 297 moves the cutting ring 279 with a first operating surface 298 into the cutting position. During the return movement and with no movement in longitudinal direction, the pressure in the ring-shaped channel 282a decreases and/or remains constant, and the first control valve 296 reduces the operating pressure inside the first adjustment cylinder 297 until a second adjustment cylinder 298a, owing to a pre-tensioning (pressure accumulator, spring), pushes the cutting ring 279 with a second operating surface 298a into the central position.

It is understood that in order to operate the first adjustment cylinder 298, a separate driving device with fluid feed can also be provided. In place of the cutting ring 279, it is also possible to provide a cutting tool or several cutting tools, wherein the cutting tool must be moved to the cutting position and the non-contacting position, in the same way as the cutting ring 279. If several cutting tools are distributed along the circumference, a can jacket 240 section can be cut off with less than one rotation of the rotating part 282.

The length of material advanced during the cutting operation depends on the advancing speed during the can jacket production and the speed of the rotating part 282. During the cutting with a cutting ring 279 and given an advancing speed of 1 m/s as well as 3000 rotations per minute, the advancing length is 20 mm. When doubling the speed or when using two simultaneously operating cutting tools, the advancing length can be cut in half.

The described cutting device can generally be used for cutting thin-walled jacket and/or tube sections, in particular into individual can jackets. An expansion to a circular shape can be dispensed with if the longitudinal welding seam is formed on a flat material that is reshaped transverse to the longitudinal axis to have a circular cross section. The described device for producing jacket pieces comprises a reshaping device, which continuously reshapes strip-shaped flat material 116 in transverse direction to the strip axis into a closed form, a welding device 231 for welding the longitudinal seam, and a cutting device as shown in FIG. 4 which cuts off individual can jackets 112.

On the inside of the continuously formed can jacket strip, a support edge 278 is arranged that is held by the reshaping device and is essentially closed in circular direction, extends in a normal plane to the longitudinal axis of the can jacket strip, fits directly against the inside of the can jacket strip, and cooperates with at least one cutting tool 279. For the cutting operation, the cutting tool 279 can be pivoted in the cutting position relative to the support edge 278, such that a cutting region rotates once around the longitudinal axis, thereby cutting off a section from the can jacket strip. During the cutting operation, the support edge 278 and the at least one cutting tool 279 can be advanced along with the can jacket strip and, following the cutting operation, the at least one cutting tool 279 can be moved to a contact-free position and, together with the support edge 278, can be moved back to the starting position it occupied prior to the cutting operation, meaning counter to the movement of the can jacket strip. It is understood that any type of cutting tool can be used in place of the cutting ring.

It will be understood that, instead of a cutting ring, any other cutting tool may be used.

FIG. 5 shows a second device for cutting can jackets 240. The conveying elements 276 and the cutting tool 279 are substantially identical, as in the embodiment of FIG. 4.

Instead of the rotating drive 291 and the drive transmission 292, an annular torque motor 391 is directly arranged about the rotating part 282. The outer peripheral surface of the torque motor 391 is, for example, held by a holding sleeve 385 or by any other holding part. The radial inner connection surface of the torque motor 391 is connected to the rotating part 282 in a non-positive way. When the torque motor 391 is switched on, the rotating part 282 rotates with the desired number of revolutions. Because of the high number of revolutions desired, the rotation motor 391 is preferably formed as an electro-motor.

If the torque motor 391 comprises coils at the outer stationary part, and permanent magnets on the rotating part 282, it does not need a separate rotational support, and the electric connections do not need a turning supply. Rotational support is ensured by rotation bearings 283, and the torque motor 391 is built directly on the rotating part 282 and the holding sleeve 385. It goes without saying that permanent magnets may be arranged on the holding sleeve instead, while the coils are on the rotating part, in which case the coils are supplied by a rotational supply device. Thus, any kind of electro-motor may be formed between the holding sleeve 385 and the rotating part 282.

The change of the centric position to the eccentric position of the cutting ring 279 is achieved by actuating drive devices 293, 294. The movements of the cutting ring 279 in the direction of the longitudinal axis of the jacket strip 272 are effected in an analogous way to the embodiment of FIG. 4. It will be understood that other approaches of actuation may also be used for these two movements.

The cutting ring 297 cooperates with a support edge 278 when cutting. In the embodiment of FIG. 5, the support edge 278 is formed on a cylindrical carrier 301. The carrier 301 comprises a first front side 302 and a second front side 303 as well as a cylindrical carrier surface 304 in-between formed to carry a can jacket 240. If the carrier surface 304 is formed of an elastic material, the can jacket 240 is held on the carrier 301 by a small friction force. Despite this holding force, the can jacket 240 is able to be pushed over the carrier 301 and to remove it again from the latter. Optionally, the carrier surface 304 is a little bit moveable in radial direction so that holding and releasing the can jacket may be controlled by effecting this movement.

Prior to the cutting operation, the carrier 301 is pushed into the jacket strip 272 from the free side. Meeting and inserting is facilitated by a contraction 302a at the first front side 302. Between the contraction 302a and the carrier surface 304, the support edge 278 is formed on the carrier 301, the cutting edge 279, during cutting, engaging with the support edge 278 on the side towards the second front side 303. The support edge supports the inner side of the jacket strip 272. Optionally, the circumference of the support edge 278 may be somewhat raised and diminished so that the engagement is improved, on the one hand, and inserting is facilitated, on the other hand.

During cutting, the support edge 278 and the cutting ring 279 are advanced together with the jacket strip 272. After cutting, the cutting ring 279 is moved in a concentric position relative to the support edge 278, and is displaced back to the initial position prior to cutting in opposite direction to the direction of movement of the jacket strip 272. The carrier 301 together with the cut can jacket 240 is moved away from the jacket strip 272. To this end, an actuating piston 305 is connected to the second front side 303 in a non-positive way. The carrier 301 together with the can jacket 240 is transmitted to further conveyance by the actuating piston 305. Subsequently, an empty carrier 305 is inserted into the jacket strip 272 by the actuating piston 305.

The actuating piston 305 forms part of an actuation device (not shown), which has to ensure at least controlled advancing and returning movements of the actuating piston 305 as well as the connection with the carrier 301 and releasing thereof. The releasable connection between the actuating piston 305 and the second front side 303 of the carrier 301 may be realized either mechanically, by a sub-pressure or an over-pressure or electro-magnetically. For an electro-magnetic connection, magnetic or spontaneously not magnetic but magnetizable material is arranged on the second front side 303 of the carrier 301, while an electromagnet is situated on the actuating piston. A second front side 303, which includes magnetic or magnetizable material, has the advantage that the carrier 301 may be conveyed on a magnetic conveyor, and may subsequently be magnetically held by subsequent treating stations. The carriers 301 have the function of pallets.

In order to position the carrier 301 accurately, the first front side 302 may engage a front stop face 273a of the expansion element 273. In this initial position, the support edge 278 of the carrier 301 is in a defined position matching the engagement position of the cutting ring 279. During cutting engagement, the cutting ring 279, optionally without any active actuation, is entrained by the advance of the jacket strip 272. Since a contact exists, when cutting, between the support edge 278 and the jacket strip 272, the carrier is optionally moved with it by friction due to the advance of the jacket strip 272. If a passive entrainment is not sufficient, the carrier 301 is moved over the desired stroke of advance by the actuating piston 305.

Due to the use of carriers 301 having each a support edge 278, one may do without a support edge 278 that is born and moved by the expansion element 273. In addition, the can jackets 240 are already on carriers 301, which substantially facilitates further treatment. In a subsequent treatment station, the can jackets 240 may be treated on the carriers 301, and may be transmitted to treatment elements without any problem.

Figure 6:
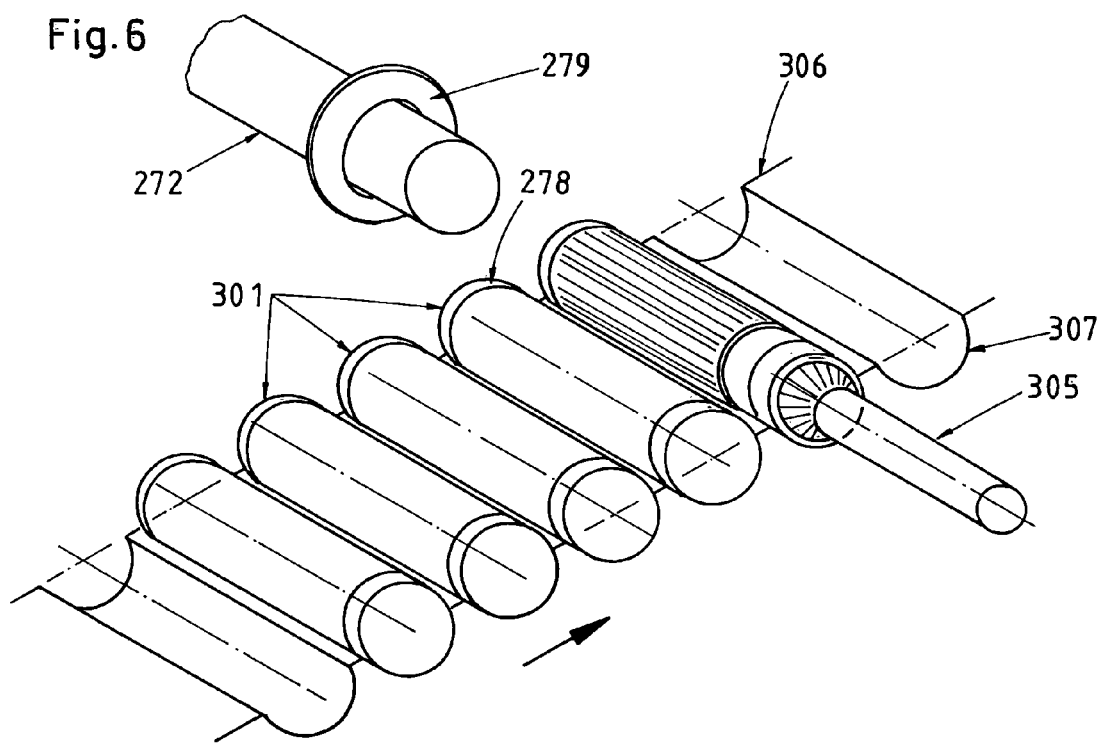

FIG. 6 shows schematically the supply of cylindrical carriers 301 to a continuously produced tube or jacket strip 272 from which tube sections or can jackets 240 are cut. At the moment shown, a carrier 301 having a cut can jacket 240 has reached a position for further conveyance. The actuating piston 305 will now be separated from the carrier 301, and the conveyor surface 306 having rest areas 307 is advanced so far that a subsequent free carrier 301 is directly in front of the jacket strip 272 in axial direction.

The actuating piston 305 pushes subsequently the free carrier 301 into the advancing open end of the jacket strip 272. As soon as the support edge 278 has reached the position at the cutting tool 279, the cutting tool 279 is moved into cutting position. After one revolution of the cutting tool 279, the can jacket 240 is separated, and the carrier 301 together with the can jacket 240 is put back onto the conveyor surface 306.

With a high throughput, it is not suitable to convey a considerable number of carriers 301 in a "stop and go" mode, because high positive and negative accelerations are needed for achieving short advance periods. Such accelerations, due to the high inertia of all carriers 301 and of the conveyor surface 306, can only be attained with a very high driving force.

FIG. 7 shows cutting can jackets with the aid of representations which are offset in time. Based on a desired throughput, a production period per can jacket will result. During this production period, the production sequences, as represented, have to be performed.

Situation a shows a carrier 301, the first front side 302 of which engages the front stop face 273a of the expansion element 273. Assuming that section of the jacket strip 272, which projects over the cutting tool 279, has a length l of a desired can section, the continuously rotating cutting tool is moved into cutting position where it cooperates with the support edge 278 of the carrier 301. At a number of revolutions of the cutting tool 279 of 6000 r.p.m., the cutting operation needs only 0.01 seconds. During this cutting period, the cutting line, the cutting tool 279 and the carrier 301 move by a first stroke h1 along the axis of the jacket strip 272, which may be seen in situation b.

In addition, a return period of 0.015 s, for example, is needed for returning the cutting tool 279, in which time the jacket strip 272 is advanced by a second stroke h2.

Having cut the can jacket 240, the situation c is reached by rapidly drawing the carrier 301 away together with the can jacket 240. For delivering the charged carrier 301, it is moved over a distance d from the cutting tool 279, for example by the actuating piston 305. The time for the carrier's return amounts, for example, to 0.03 s. During this return period, the open end of the jacket strip 272 has already been advanced by a third stroke h3.

Situations d and e represent the carrier exchange. In doing this, the actuating piston 305 is released from the charged carrier 301, the charged carrier 301 is moved away transversely to the axis of the jacket strip 272, and an empty carrier 301 is positioned on this axis. For exchanging the carrier, for example a period of 0.033 s is provided. During this exchange period, the jacket strip 272 moves by a fourth stroke h4.

Situation f shows that about 0.03 s are needed for the insertion of the carrier 301, and about 0.015 s are needed for advancing the cutting tool 279, while in this period the jacket strip 272 has advanced by a fifth stroke h5. At this initial moment of the cutting operation, the can jacket 240 has the desired length l.

The exchange of carriers should preferably be solved in such a manner that the performed mass acceleration is as small as possible. Therefore, it should be just two carriers 301 only which are moved when exchanging carriers. In addition, it is suitable if the carriers have a mass as small as possible. FIGS. 8 and 9 show an embodiment of the supply of cylindrical carriers 301 by a continuous conveyor device 308, for example a conveying belt having reception cavities for the carriers 301, and by a subsequent exchanging device 309.

FIG. 8 shows the situation immediately prior to the carrier exchange. In axial direction, centrally in front of the cutting device 277 is a charged carrier 301, and at left from it is an empty carrier 301 that is moved to the exchange device 309 by the conveyor device 308. The exchange device 309 comprises a slide 310 which is guided by a guidance 311, and is actuated by a drive unit 312. In order to entrain the carrier 301 to be supplied on the slide 310 in its movement to the right, drivers 313 are moved into driving position at least at both sides of the carrier 301 to be supplied.

In a quick movement, the charged carrier and the carrier to be supplied 301 are displaced in such a manner that the carrier to be supplied is positioned on the axis of the jacket strip 272. Thus, this empty carrier 301 accelerated and braked down. The charged carrier 301, in the embodiment shown, is only accelerated by the drivers 313. On a further transport path 314, the charged carrier 301 may be broken later. FIG. 9 shows the situation directly at the end of the carrier exchange. Since the carrier exchange is performed very quickly, the next carrier 301 on the continuous conveyor device 308 is offset to the right only in an unsubstantial manner.

During cutting operation, the slide 310, with the drivers 313 retracted, may be moved to the left initial position by the driving unit 312, and the next carrier 306 is continuously moved into the position on the slide. At the beginning of the carrier exchange, the next carrier 301 is on the slide 310 between the standing drivers 313, as is shown in FIG. 8.

The invention claimed is:

1. A method for producing at least one tubular jacket, comprising:
   continuously forming a strip-shaped sheet material, transverse to a strip axis, into a closed jacket strip;
   welding of a longitudinal seam along the closed jacket strip; and
   cutting, the at least one tubular jacket from the closed and welded jacket strip, wherein a support edge arranged at one end of a piston-cylinder unit is provided on an inside of the continuously formed jacket strip for the cutting, essentially in the form of a closed circle and extending in a normal plane to the longitudinal axis of the jacket strip, which fits directly against the inside of the jacket strip and cooperates with at least one cutting tool to rotate around the strip axis, the at least one cutting tool being pivoted into the cutting position during the cutting operation along the support edge so that a cutting region rotates once around the longitudinal axis and, in the process, a tubular section of the jacket strip is cut off, and wherein during the cutting, the support edge and the at least one cutting tool are advanced along with the jacket strip and, following the cutting, the at least one cutting tool is moved to a non-contacting position relative to the support edge and together with the support edge, is moved counter to the movement of the jacket strip and back to the starting position occupied prior to the cutting operation
   wherein, before the welding, the strip-shaped sheet material is given a flat-pressed shape with two curving regions and, after welding, the flat-pressed jacket strip is expanded into the circular cross-section of the support edge by an expansion element arranged inside the jacket strip before the cutting.

2. The method according to claim 1, wherein the expansion element is held by a holder, which is located in a region where the strip-shaped sheet material is not yet closed, the expansion element is mounted on two holding rods, arranged in the two curving regions of the flat-pressed jacket strip and extending from the expansion element to the holder.

3. The method according to claim 1, wherein the movements of the support edge are guided by at least one guiding device, said support edge being connected to the expansion element through the at least one guiding device.

4. The method according to claim 1, wherein the support edge is introduced into the jacket strip to be cut from the open side of the jacket strip in opposite direction to the direction of advance of the jacket strip.

5. The method according to claim 4, wherein the tubular jacket is cut after delivery by the support edge, and wherein the support edge, for cutting another tubular jacket, is introduced into the jacket strip which meanwhile has already advanced.

6. The method according to claim 4, wherein the tubular jacket is cut and the tubular jacket is further moved onto a cylindrical carrier, each carrier including a first front side including the support edge, a second front side including at least one connection device for a releasable connection to a piston part and a cylindrical carrier surface in-between.

7. The method according to claim 1, wherein the at least one cutting tool includes one cutting tool to rotate once around the longitudinal axis and, in the process, cut off the tubular section.

\* \* \* \* \*